(12) United States Patent
Wallace et al.

(10) Patent No.: US 9,815,634 B1
(45) Date of Patent: Nov. 14, 2017

(54) METHOD FOR MONITORING THE CONDITION OF A CONVEYOR BELT AND CONVEYOR BELT MONITORING SYSTEM

(71) Applicant: ContiTech Transportbandsysteme GmbH, Hannover (DE)

(72) Inventors: Jack Wallace, Powell, OH (US); Jacques Basson, Glenwood Durban (ZA)

(73) Assignee: ContiTech Transportbandsysteme GmbH, Hannover (DE)

(*) Notice: Subject to any disclaimer, the term of this patent is extended or adjusted under 35 U.S.C. 154(b) by 0 days.

(21) Appl. No.: 15/135,193

(22) Filed: Apr. 21, 2016

(51) Int. Cl.
   *B65G 43/02* (2006.01)
   *B65G 15/36* (2006.01)

(52) U.S. Cl.
   CPC ............. *B65G 43/02* (2013.01); *B65G 15/36* (2013.01); *B65G 2203/0275* (2013.01)

(58) Field of Classification Search
   CPC ................................. B65G 43/02; B65G 43/06
   USPC ..................................................... 198/810.02
   See application file for complete search history.

(56) References Cited

U.S. PATENT DOCUMENTS

| | | | |
|---|---|---|---|
| 2,901,847 A * | 9/1959 | Lee | G09F 11/295 40/471 |
| 7,810,634 B2 | 10/2010 | Wallace et al. | |
| 8,069,975 B2 | 12/2011 | Wallace | |
| 8,256,607 B2 | 9/2012 | Wallace et al. | |
| 8,657,105 B2 * | 2/2014 | Twigger | B65G 43/02 198/502.1 |
| 9,359,147 B2 | 6/2016 | Wallace et al. | |
| 2015/0144459 A1 | 5/2015 | Wallace et al. | |

FOREIGN PATENT DOCUMENTS

| | | | | |
|---|---|---|---|---|
| GB | 2303834 A * | 3/1997 | ............. | B65G 43/02 |
| WO | 97/05047 A1 | 2/1997 | | |

OTHER PUBLICATIONS

International Search Report and Written Opinion of the international searching authority dated Apr. 26, 2017 in corresponding international patent application PCT/EP2017/053445.

* cited by examiner

*Primary Examiner* — Leslie A Nicholson, III
*Assistant Examiner* — Lester Rushin
(74) *Attorney, Agent, or Firm* — Walter Ottesen, P.A.

(57) ABSTRACT

A method for monitoring the condition of a rip detection insert embedded in a conveyor belt, the rip detection insert having a plurality of rip detection wires comprised of a magnetically permeable material; the method including the steps of: inducing a magnetic field within the rip detection wires of the rip detection insert; measuring at least one magnetic characteristic of the rip detection insert; monitoring the at least one magnetic characteristic of the rip detection insert for changes in the magnetic characteristic; determining the rip detection insert has been damaged when a change in at least one magnetic characteristic of the rip detection insert deviates beyond a predetermined threshold for the rip detection insert; and, filtering out a region of the rip detection insert containing the damage to the rip detection insert.

27 Claims, 7 Drawing Sheets

METHOD FOR MONITORING THE CONDITION OF A CONVEYOR BELT AND CONVEYOR BELT MONITORING SYSTEM

FIELD OF THE INVENTION

The invention relates to a method for monitoring the condition of a conveyor belt having rip detection inserts embedded therein and a conveyor belt rip detection system for monitoring a conveyor belt having rip detection inserts embedded therein.

BACKGROUND OF THE INVENTION

U.S. Pat. No. 8,069,975 discloses a conveyor belt rip detection system with rip detection inserts and is incorporated herein by reference. The rip detection inserts can be easily integrated into the conveyor belt at low cost. The rip detection inserts do not negatively affect the durability of the conveyor belt and can be easily replaced if belt damage occurs. The rip detection system provides a reliable early image of belt damage which can facilitate a quick repair before more extensive belt damage occurs. The conveyor belt disclosed in U.S. Pat. No. 8,069,975 includes an elastomeric body with a load carrying surface, a reinforcement ply disposed in the elastomeric body and a multiplicity of rip detection inserts. The rip detection inserts are spaced along the longitudinal length of the conveyor belt and include a plurality of rip detection wires. The rip detection wires are made of a magnetically permeable material and are aligned at a bias angle of 15° to 75° with respect to a perpendicular to the longitudinal direction of the belt. The patent further discloses a method for detecting damage to a conveyor belt as the conveyor belt advances through a conveyor system. The rip detection wires are spaced incrementally across the width of the belt.

The disclosure of U.S. Pat. No. 8,069,975 enables the operators of a conveyor belt to not only determine where along the length of the conveyor belt to look for rip damage but also to locate the damage relative to the edge of the belt. However, it does not enable the continued monitoring of the portions of the rip detection insert that are not damaged.

U.S. Pat. No. 8,256,607 discloses a monitoring system for a moving conveyor belt. The conveyor belt has a plurality of embedded reinforcing cords and identification tags. A tag reader detects and identifies the identification tags passing by the tag reader while a belt monitor scans the cords to detect a plurality of magnetic reference points and a damage event of at least one cord. A control unit in communication with the belt monitor and the tag reader analyzes the belt monitor to identify the plurality of magnetic reference points and the damage event. The control unit also acquires a belt location on the moving conveyor belt from a belt map based on the detected and identified identification tag and a magnetic reference point from the plurality of magnetic reference points. When a damage event is identified, the location of the damage event is determined by the control unit based on the acquired belt location.

SUMMARY OF THE INVENTION

It is an object of the invention to provide a method for monitoring a conveyor belt which enables the continued monitoring of the portions of the rip detection insert which are not damaged. It is a further object of the invention to provide a conveyor belt rip detection system which continues to monitor a rip detection insert after it has been subject to damage. By detecting the magnitude or extent of damage to the belt by the damage event, the conveyor belt system's downtime, the cost of replacing parts, system repair costs and clean-up costs can be greatly reduced. According to a feature, the filtering out of a damaged section of the rip detection insert enables a continued, lower level monitoring for the non-damaged section of the rip detection insert. That is, the method and apparatus according to the invention enable the continued monitoring of a damaged rip detection insert in an effort to offer a limited amount of longitudinal damage detection instead of completely disabling the damaged rip detection insert.

The object can, for example, be achieved by a method for monitoring the condition of a rip detection insert embedded in a conveyor belt. The rip detection insert has a plurality of rip detection wires made of a magnetically permeable material. The method includes the steps of:

inducing a magnetic field within the rip detection wires of the rip detection insert;

measuring at least one magnetic characteristic of the rip detection insert;

monitoring the at least one magnetic characteristic of the rip detection insert for changes in the magnetic characteristic;

determining the rip detection insert has been damaged when a change in at least one magnetic characteristic of the rip detection insert deviates beyond a predetermined threshold for the rip detection insert; and, filtering out a region of the rip detection insert containing the damage to the rip detection insert.

The object can, for example, further be achieved by a conveyor belt monitoring system for monitoring the condition of a rip detection insert embedded in a conveyor belt. The rip detection insert has a plurality of rip detection wires made at least in part of magnetically permeable material. The conveyor belt monitoring system includes: a field generator configured to induce magnetic fields in the rip detection wires so as to impart the rip detection insert with magnetic characteristics; a sensor configured to measure at least one magnetic characteristic of the rip detection insert; a control unit configured to determine a damage event when a magnetic characteristic of the rip detection insert measured by the sensor deviates beyond a predetermined threshold from at least one of a predetermined value and a value of previously measured magnetic characteristic of the rip detection insert. The control unit is further configured to filter out the damage event and to determine further damage events to the rip detection insert.

The object can, for example, also be achieved by a method for monitoring the condition of a rip detection insert embedded in a conveyor belt, the rip detection insert having a plurality of rip detection wires comprised of a magnetically permeable material; the method including the steps of: inducing a magnetic field within the rip detection wires of the rip detection insert; measuring at least one magnetic characteristic of the rip detection insert; monitoring the at least one magnetic characteristic of the rip detection insert for changes; determining the rip detection insert has been damaged when a change in at least one magnetic characteristic of the rip detection insert deviates beyond a predetermined threshold for the rip detection insert; outputting a damage event signal when damage to the rip detection insert has been determined; stopping the conveyor belt in response to the damage event signal so as to limit conveyor belt damage and allow for inspection of the belt; and, filtering out a region of the rip detection insert containing the damage to the rip detection insert so as to enable a continued monitoring the damaged rip detection insert.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
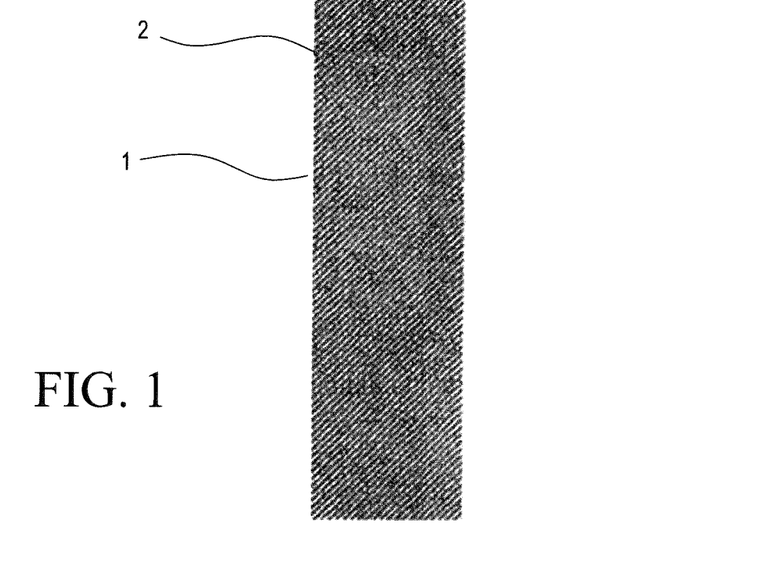
FIG. 1 is a schematic cross-sectional view of an undamaged rip detection insert showing a plurality of rip detection wires therein.
Figure 2:
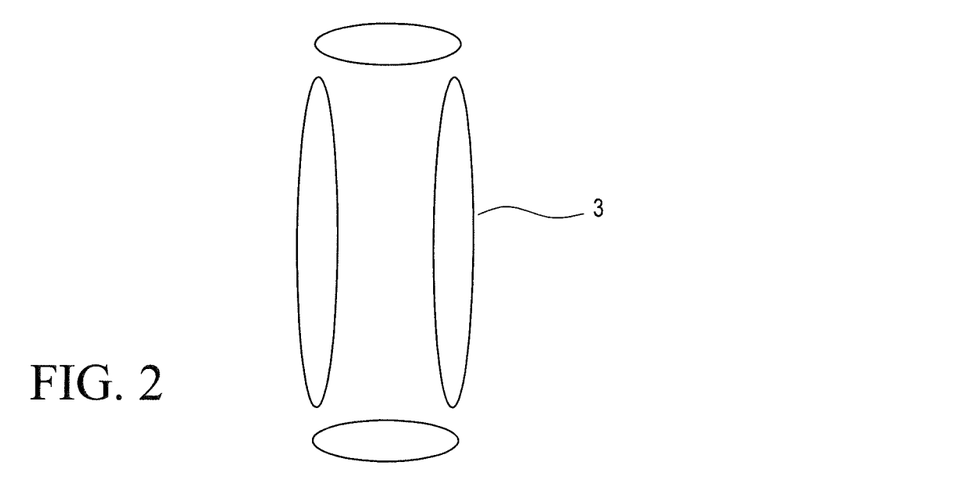
FIG. 2 shows the magnetic field image of the rip detection insert shown in FIG. 1.

FIG. 1 shows an example of a rip detection insert 1 in a schematic plan view. The rip detection insert 1 has a plurality of rip detection wires 2. The rip detection wires 2 include a magnetically permeable material, for example, ferromagnetic material. The rip detection wires 2 in FIG. 1 are aligned in the rip detection inserts 1 at a bias angle of 15° to 75° with respect to a perpendicular to the longitudinal direction of a conveyor belt 7 (see FIG. 12). In a configuration of the rip detection insert, the individual rip detection wires extend over at most 70% of the belt width, however, other rip detection insert configurations may also be used. The rip detection wires 2 are spaced incrementally across the width of the rip detection insert 1. The rip detection insert 1 shown in FIG. 1 has not sustained any belt damage. A magnetic field is induced in the rip detection insert by, for example, first passing it over a permanent magnet. The resulting induced magnetic field is then detected. FIG. 2 shows a schematic example of a resulting magnetic field 3 of the rip detection insert shown in FIG. 1.

Figure 3:
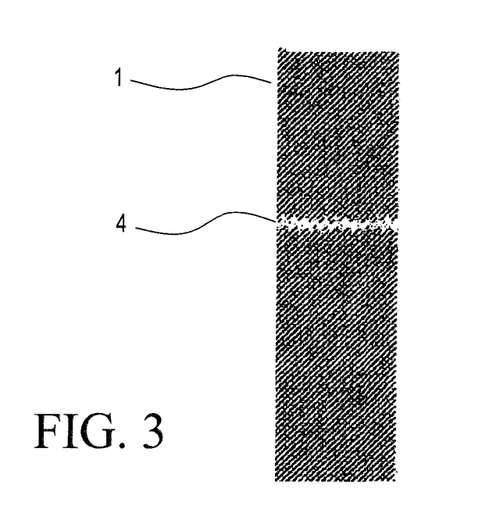
FIG. 3 is a schematic cross-sectional view of a damaged rip detection insert.
Figure 4:
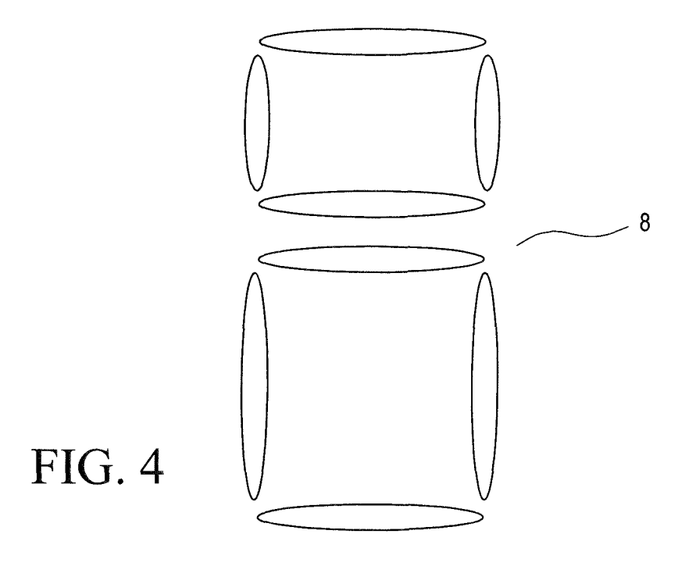
FIG. 4 shows the magnetic field image of the damaged rip detection insert of FIG. 3.
Figure 6:
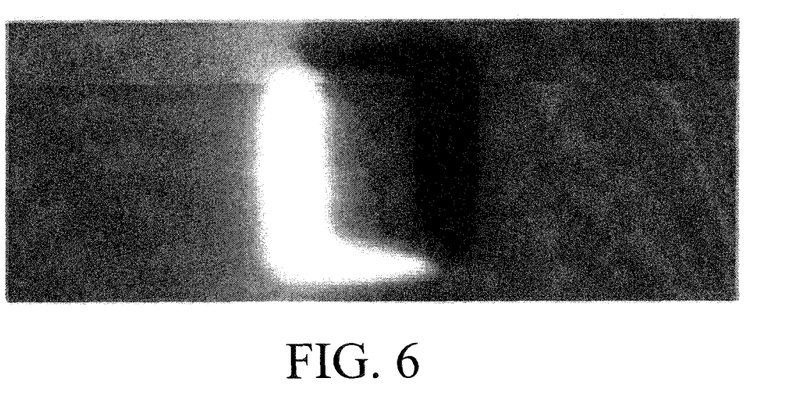
FIG. 6 shows a magnetic field image of the rip detection insert of FIG. 3 as captured by the sensor.
Figure 7:
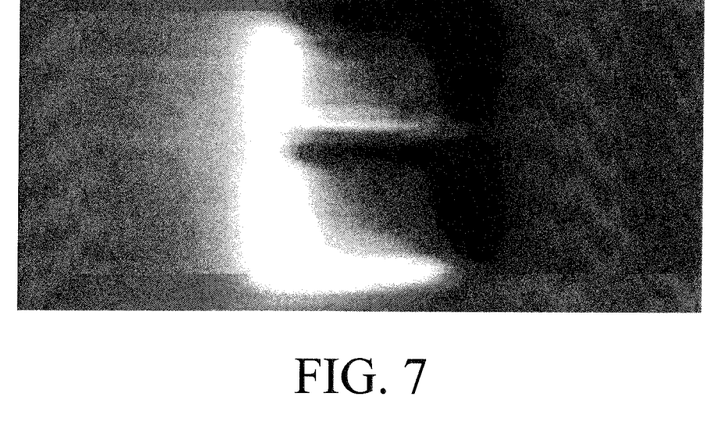
FIG. 7 shows a magnetic field image of a damaged rip detection insert.

FIG. 3 shows the rip detection insert 1 of FIG. 1 after being damaged; in the example, the rip detection insert is ripped across the entire width of the insert causing the damage event 4. The damage event could also be a localized damage event that does not manifest as a longitudinal rip event. FIG. 4 is a schematic of the magnetic field 8 of the damaged rip detection insert 1 of FIG. 3. The magnetic field image is subdivided into multiple sub-panel magnetic images. In practice, the image of the magnetic field polarity associated with one side of the rip detection insert often assumes an L-shape as shown in FIG. 6.

Figure 5:
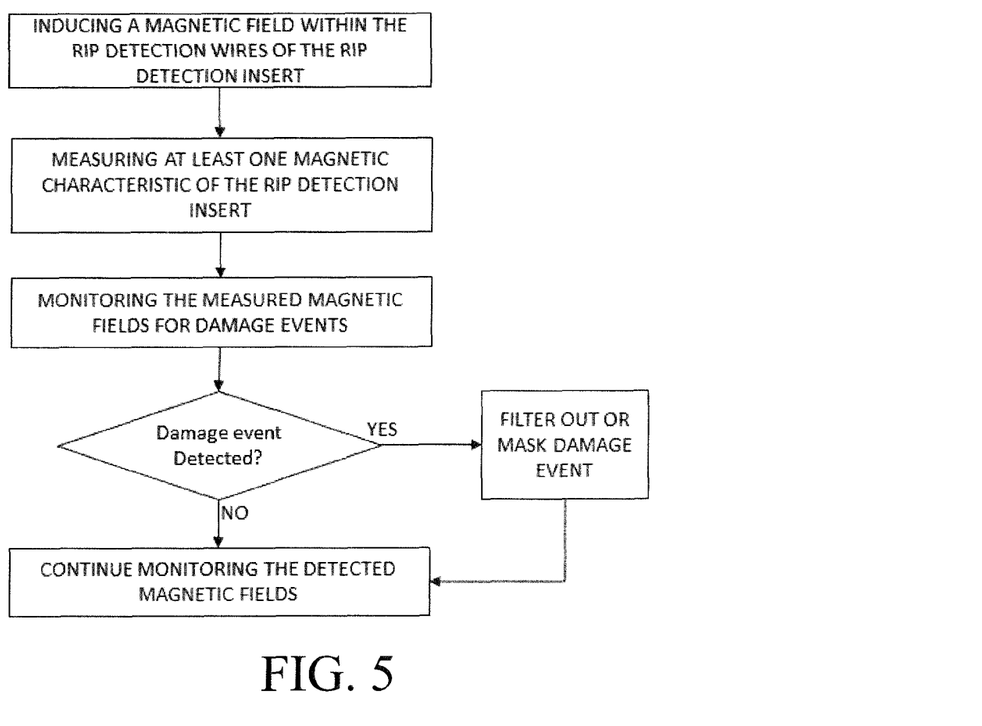
FIG. 5 is a flowchart illustrating a process for monitoring a conveyor belt.
Figure 8:
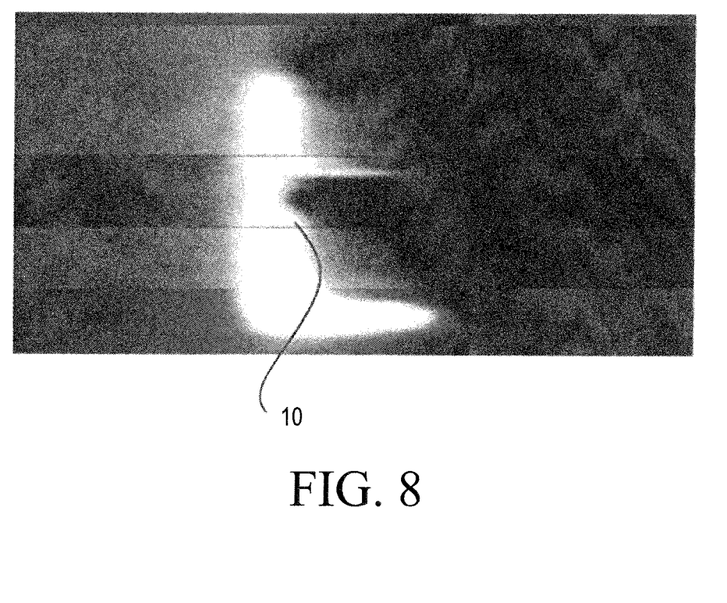
FIG. 8 shows a magnetic field image captured by a sensor of the conveyor belt monitoring system with a region containing damage to the rip detection insert designated for filtering.

FIG. 5 is a flow chart of a method for monitoring the condition of a conveyor belt having rip detection inserts 1. In an initial step, a magnetic field is generated within the rip detection wires 2 of the rip detection inserts by a field generator 5 (See FIG. 11). In particular, the magnetic field can be generated by passing the rip detection insert over a permanent magnet. At least one magnetic characteristic of the rip detection insert is detected or captured by a sensor 6 (see FIG. 11). The sensor 6 can be a sensor array which includes a plurality of individual sensors. An example of an image of the magnetic field captured by the sensor 6 is shown in FIG. 6. The magnetic field images of the rip detection inserts 1 are monitored for damage events. Damage events are, for example, detected when the magnetic field image of a rip detection insert 1 contains multiple sub-panel magnetic images. A further indicator that the rip detection insert has sustained damage is where an image of the magnetic field of the rip detection insert contains more than one positive and one negative region. Damage may also be detected by comparing the width of the measured magnetic field to a predetermined, expected value. If the width of the measured magnetic field deviates beyond a predetermined threshold from the predetermined, expected value, a damage event is detected. FIG. 8 shows a magnetic field image captured by the sensor 6 of a damaged rip detection insert. It is also possible to monitor the structure of the magnetic field in the image for changes. Such changes can indicate damage to the rip detection insert 1 which is not consistent with a typical rip event. Damage can also be determined due to the absence of a magnetic field, that is when a magnetic field is expected at a belt location but none is detected by the sensor 6. For this, the belt locations of the individual rip detection inserts can, for example, be documented in a belt map. In order to avoid nuisance shutdowns of the belt, the system can require that two sequential rip detection inserts not be detected before triggering an alarm. When the polar regions of the magnetic field of the rip detection insert change beyond a predetermined threshold is another manner of determining that the rip detection insert has sustained damage.

A magnetic characteristic of measured magnetic field can also be compared to a magnetic characteristic of a magnetic field which was measured during an earlier measurement. For this, the measurement values, are stored in a data storage unit 13 for later comparison to a newly measured value or more recent measurement. If no damage event is detected, the conveyor belt rip detection system continues monitoring the magnetic field images of the rip detection inserts 1 of the conveyor belt 7. If a damage event is detected, the damage event is filtered out or masked, for example by a control unit 9. The damage event can also be compared to a damage threshold and, if the damage event is below the threshold, the damage event is filtered out and, if the damage event is above the threshold, an alarm or warning signal can be triggered, the belt can be stopped for further inspection and repair or first prepared for further inspection and repair. The threshold at which the alarm is triggered can be an operator set value. The alarm alerts the operator that the system should be inspected for the source of the damage in order to remove the source or cause of the belt damage.

The conveyor belt 7 is then further monitored for damage with the damage event filtered out or masked. In FIG. 8, the horizontal band represents the damaged region of the rip detection insert which is to be filtered out. In the example shown in FIG. 8, the filtered region 10 covers the full width of the rip detection insert. If the damage is close to the edge of the belt, the filtered region 10 can be extended to the edge of the rip detection insert. The extent of the filtered region 10 can be set by an operator or can be set automatically by the control unit 9.

The method can further include a determining of the position of the edge of the rip detection insert from the measured magnetic characteristic. The position of the edge of the rip detection insert can then be used as a positional reference for defining a region of the rip detection insert that is to be filtered out.

The method for monitoring the rip detection inserts can utilize a first threshold, for example a magnetic field intensity threshold (such as Tesla, Gauss or mV filter), and a second threshold, for example, a magnetic field intensity area threshold (pixel filter), to detect or determine the presence of a rip detection insert. A third threshold, a magnetic field intensity damage threshold, is then used to determine whether the detected rip detection insert has been damaged and a fourth threshold is used to determine whether the damage to the rip detection insert is significant enough to require immediate repair or whether the belt can remain in use because the damage to the rip detection insert is not substantial enough. If the damage is deemed not substantial enough to warrant a stopping of the belt, the monitoring system continues to monitor the rip detection inserts, including the rip detection insert that has sustained damage with the damaged region of the rip detection insert filtered out for further monitoring.

Figure 9:
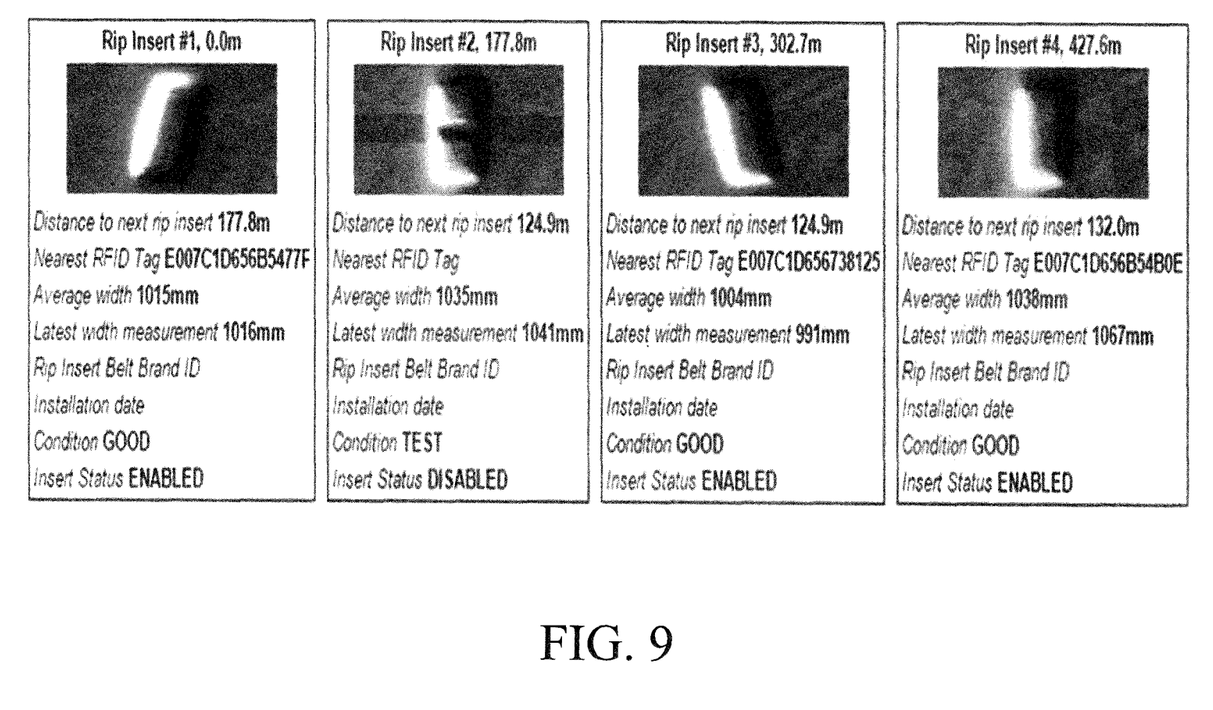
FIG. 9 shows the magnetic field image of four rip detection inserts measured sequentially.
Figure 10:
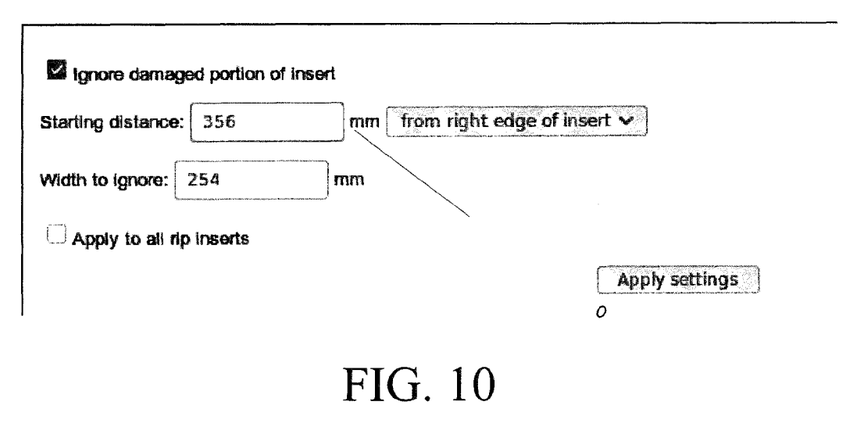
FIG. 10 shows an exemplary embodiment of a user interface which enables a user to set which region of the rip detection insert is to be filtered or ignored.

FIG. 9 shows the magnetic field image of four rip detection inserts measured sequentially. The second rip insert has a detected damage event and the band across the width of the image of the second rip detection insert is the area to be filtered. FIG. 10 shows an example of a user interface which enables a user to set which region of the rip detection insert is to be filtered or ignored. In the example according to FIG. 10, the user can select the starting distance from an edge of the rip detection insert and the width of the region to be filtered. This process can, however, also be performed automatically by the conveyor belt monitoring system, for example, by detecting the region of the rip detection insert which deviates from an expected value or from a previous measured value of the same region of the same rip detection insert and filtering the same.

Figure 11:
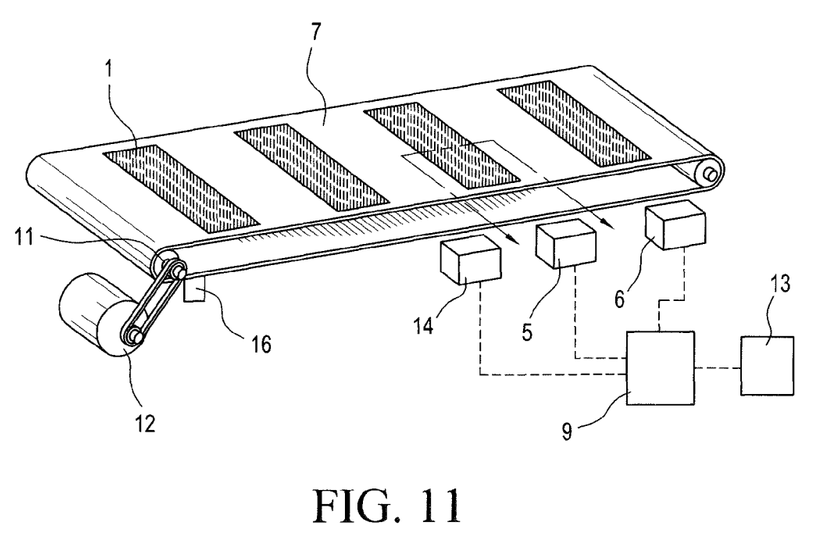
FIG. 11 shows a conveyor belt rip detection system with a conveyor belt.

FIG. 11 shows an example of a conveyor belt system according to the invention. The conveyor belt system includes a belt 7 having a plurality of rip detection inserts 1. The individual rip detection inserts can be mapped as a function of longitudinal position. Conveyor belts of other configurations not shown in FIG. 11 can also be used in the context of the invention, for example, a tubular belt. The system further includes a conveyor belt rip detection or monitoring system. The rip detection system has a field generator 5 for generating magnetic fields in the rip detection wires 2 of the rip detection inserts. The field generator can be a permanent magnet. The sensor 6 of the rip detection system detects the magnetic field images of the rip detection inserts 1 as generated by their respective rip detection wires 2.

Figure 12:
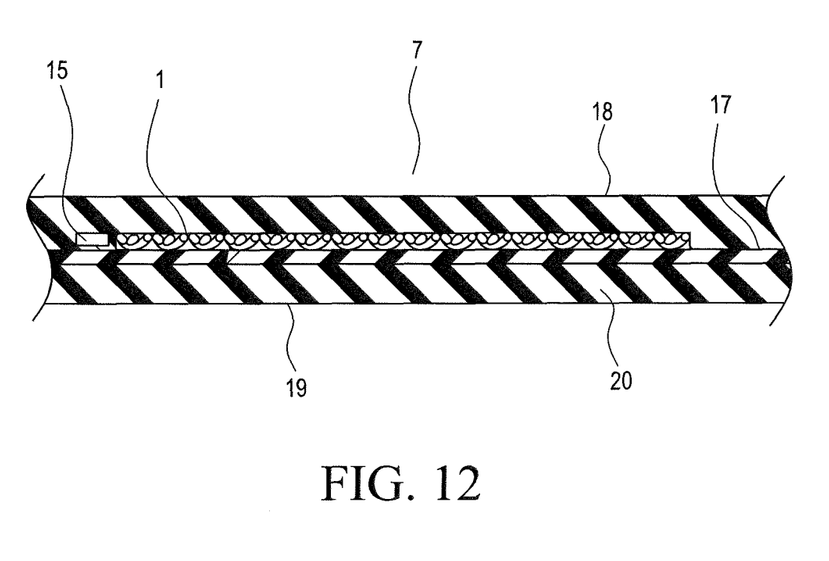
FIG. 12 shows a cut-away section of the conveyor belt of FIG. 11 with a rip detection insert embedded therein.

FIG. 12 shows a cut-away section of the conveyor belt 7 of FIG. 11 with a rip detection insert 1 embedded therein. As shown in FIG. 11, the conveyor belt system can further include a pulley system 11 for receiving a pulley engaging surface 19 of the belt 7. A driver 12 drives the belt 7 along the pulley system 11. The conveyor belt of FIG. 12 defines a longitudinal belt direction and has an elastomeric body 20 defining a load carrying surface 18. A reinforcement ply 17 is disposed within the elastomeric body 20. The elastomeric body 20 further defines a parallel pulley engaging surface 19. The rip detection wires 2 can, according to a configuration of the rip detection insert, be aligned in the rip detection inserts at a bias angle of 15° to 75° from being perpendicular to the longitudinal direction of the belt. The rip detection wires are spaced incrementally across the width of the belt. Further, according to an example configuration of the rip detection insert, the individual rip detection wires extend at most across 700 of the width of the belt.

As the conveyor belt 7 moves through the conveyor belt system, the conveyor belt monitoring system monitors the rip detection inserts 1 embedded in the belt 7. While the belt 7 is moving, the rip detection insert 1 passes over a field generator 5, for example a permanent magnet. The field generator 5 induces a magnetic field in the rip detection wires 2 of the rip detection insert 1. The belt 7 then continues moving past a sensor 6. The sensor 6 measures at least one magnetic characteristic of the rip detection insert 1. For example, the magnetic field of the rip detection insert 1 induced by the field generator 5 is imaged.

A control unit 9, for example a computer processing unit, uses at least one magnetic characteristic to determine whether the rip detection insert 1 is damaged. The control unit 9 first determines the presence of the rip detection insert 1 on the basis of the measurement of the sensor 6. A third threshold is used to determine whether the rip detection insert 1 is damaged or remains undamaged. A fourth threshold determines whether the damage requires the belt 7 to be stopped or whether the belt 7 can be kept in operation with the damaged region of the belt insert filtered or masked.

The control unit 9 may compare the width of the magnetic field to an expected value for the width of the magnetic field of the rip detection insert. The control unit 9 can also compare the measured magnetic characteristic to an earlier magnetic characteristic of the same rip detection insert 1. If the measured characteristic deviates from the expected value or the previously measured value by more than a predetermined amount, the control unit 9 determines that the rip detection insert 1 is damaged. If the control unit 9 determines that the rip detection insert 1 is damaged, a fourth threshold is then applied to determine whether the damage is substantial. That is, if the damage is below the fourth threshold, the control unit 9 filters out the damaged region of the rip detection insert 1 and continues to monitor the belt for damage, including the rip detection insert 1 having the damage filtered out. If the damage is above the fourth threshold, the control unit 9 can send an alarm signal. The alarm signal can be used to warn an operator of the damage, stop the belt and/or move the belt so as to place the damaged rip detection insert 1 to an inspection area. At the inspection area, the condition of the rip detection insert can be visually inspected by an operator and/or inspected by an operator using a handheld magnetic sensor, such as the Continental's Conti® CordInspect damage inspector.

If a certain length of the belt has passed the sensor 6 without the control unit 9 detecting any rip detection inserts 1, the control unit can also send an alarm signal. This covers the case where a rip detection insert 1 has been pulled right out of the belt 7 or if the belt has torn across its width. A proximity sensor 16 can also be used to aid in the determination of the longitudinal position of the rip detection insert. The proximity sensor 16 can, for example, be connected adjacent to a pulley 11 that contains a series of targets. The proximity sensor 16 can read out, in particular continuously, the distance the belt has traveled. The distance traveled by the belt as measured by the proximity sensor 16 can be provided to the control unit 9 for the determining the longitudinal position of the rip detection insert 1.

The conveyor belt monitoring system can include a data storage unit 13 to store the measured magnetic characteristic(s) of each rip detection insert. The data storage unit 13 can also have a belt map stored thereon. The belt map can include location information of each rip detection insert. The location can be stored with respect to belt splice information. For steel-cord conveyor belts, the splices can be used as the primary reference points and the pattern of segment lengths is used to uniquely identify the locations. For fabric conveyor belts, the splices have no magnetic signal, so the same thing is done with rip detection inserts used to define the segments. RFID tags can also be used to identify the individual rip detection inserts. A RFID tag 15 associated with a rip detection insert 1 is read by a RFID tag reader 14 as the belt passes via which the control unit 9 can identify the rip detection insert.

It is understood that the foregoing description is that of the preferred embodiments of the invention and that various changes and modifications may be made thereto without departing from the spirit and scope of the invention as defined in the appended claims.

LIST OF REFERENCE NUMERALS

Part of the Description

1 Rip detection insert
2 Rip detection insert wire
3 Magnetic field
4 Damage event
5 Field generator
6 Sensor
7 Conveyor Belt
8 Magnetic field of damaged rip detection insert
9 Control unit
10 Damaged region to be filtered
11 Pulley system
12 Driver
13 Data storage unit
14 RFID tag reader
15 RFID Tag
16 Proximity sensor
17 Reinforcement ply
18 Load carrying surface
19 Pulley engaging surface
20 Elastomeric body

What is claimed is:

1. A method for monitoring the condition of a rip detection insert embedded in a conveyor belt, the rip detection insert having a plurality of rip detection wires comprised of a magnetically permeable material; the method comprising the steps of:
    inducing a magnetic field within the rip detection wires of the rip detection insert;
    measuring at least one magnetic characteristic of the rip detection insert;
    monitoring the at least one magnetic characteristic of the rip detection insert for changes in the magnetic characteristic; determining the rip detection insert has been damaged when a change in at least one magnetic characteristic of the rip detection insert deviates beyond a predetermined threshold for the rip detection insert; and,
    filtering out a region of the rip detection insert containing the damage to the rip detection insert so as to cause said region of the rip detection insert containing the damage to be ignored in further monitoring of the at least one magnetic characteristic of the rip detection insert.

2. The method of claim 1 further comprising the step of outputting a damage event signal when damage to the rip detection insert has been determined.

3. The method of claim 2 further comprising the step of stopping the conveyor belt in response to the damage event signal so as to limit conveyor belt damage and allow for inspection of the belt via an operator.

4. The method of claim 3 further comprising the step of moving the belt so as to position the damaged rip detection insert at an inspection area.

5. The method of claim 1, wherein at least one magnetic characteristic is the width of the magnetic field of the rip detection insert generated by inducing a magnetic field in the rip detection wires of the rip detection insert.

6. The method of claim 1, wherein said monitoring the magnetic characteristic of the rip detection insert for changes includes comparing the measured magnetic characteristic to a predetermined value.

7. The method of claim 1, wherein the conveyor belt is a component of a conveyor belt system having a display unit, the method further comprising the step of:
    displaying a graphical representation of the measured magnetic characteristic with a user interface on the display unit, the graphical user interface being configured to enable an operator to determine the damaged rip detection insert region to be filtered out.

8. The method of claim 1, further comprising the step of storing at least one magnetic characteristic of the rip detection insert.

9. The method of claim 8, wherein said monitoring the at least one magnetic characteristic of the rip detection insert for changes includes the steps of:
    re-measuring the magnetic characteristic of the rip detection insert; and,
    comparing the stored magnetic characteristic of the rip detection insert to the re-measured magnetic characteristic of the rip detection insert.

10. The method of claim 1, wherein the conveyor belt includes a plurality of rip detection inserts and the method steps are performed on each of the rip detection inserts.

11. The method of claim 10, wherein the conveyor belt is a component of a conveyor belt system having a belt map having the location data of each rip detection insert stored therein; and, at least one magnetic characteristic of each rip detection is measured and stored in the belt map with the location data of the corresponding rip detection insert.

12. The method of claim 10 further comprising the step of determining the identity and location of the rip detection insert having the damaged region.

13. The method of claim 1 further comprising the step of monitoring the rip detection insert for new damage in unfiltered regions of the rip detection insert.

14. The method of claim 1, wherein the condition of the rip detection insert is monitored as the conveyor belt moves through a conveyor belt system.

15. The method of claim 14, wherein the conveyor belt system further includes a pulley system configured to receive a pulley engaging surface of the belt; a driver configured to drive the belt along the pulley system; a magnetic field generator configured to generate the magnetic field within the rip detection wires; and, a sensor arrangement configured to detect the magnetic field generated in the rip detection wires.

16. A method for monitoring the condition of a rip detection insert embedded in a conveyor belt, the rip detection insert having a plurality of rip detection wires comprised of a magnetically permeable material; the method comprising the steps of:
- inducing a magnetic field within the rip detection wires of the rip detection insert;
- measuring at least one magnetic characteristic of the rip detection insert;
- monitoring the at least one magnetic characteristic of the rip detection insert for changes in the magnetic characteristic; determining the rip detection insert has been damaged when a change in at least one magnetic characteristic of the rip detection insert deviates beyond a predetermined threshold for the rip detection insert;
- filtering out a region of the rip detection insert containing the damage to the rip detection insert;
- determining a position of an edge of the rip detection insert from the measured at least one magnetic characteristic; and,
- defining a region of the rip detection insert containing the damage to be filtered out using the determined position of the edge of the rip detection insert as a positional reference.

17. A conveyor belt monitoring system for monitoring the condition of a rip detection insert embedded in a conveyor belt, the rip detection insert having a plurality of rip detection wires made at least in part of magnetically permeable material, the conveyor belt monitoring system comprising:
- a field generator configured to induce magnetic fields in the rip detection wires so as to impart the rip detection insert with magnetic characteristics;
- a sensor configured to measure at least one magnetic characteristic of the rip detection insert;
- a control unit configured to determine a damage event when a magnetic characteristic of the rip detection insert measured by said sensor deviates beyond a predetermined threshold from at least one of a predetermined value and a value of previously measured magnetic characteristic of the rip detection insert; and,
- said control unit being further configured to filter out a region of the rip detection insert containing said damage event and to determine further damage events to the rip detection insert with said region of the rip detection insert containing said damage event filtered out.

18. The conveyor belt monitoring system of claim 17, wherein said control unit is configured to output a damage alert signal when a damage event is determined.

19. The conveyor belt monitoring system of claim 17, wherein:
- said sensor is further configured to perform a first and a second measurement of at least one magnetic characteristic of the rip detection insert; and,
- said control unit is configured to determine a damage event when the magnetic characteristic of the rip detection insert of said first measurement and the magnetic characteristic of the rip detection insert of said second measurement deviate beyond a predetermined threshold.

20. The conveyor belt monitoring system of claim 17, wherein said control unit is further configured to determine the identity and location of the rip detection insert.

21. The conveyor belt monitoring system of claim 17, wherein said control unit is configured to position the conveyor belt to an inspection location so as to enable a visual inspection of the damaged rip detection insert region by an operator.

22. The conveyor belt monitoring system of claim 17 further comprising a data storage unit having a belt map having the location data of each rip detection insert stored therein; and, said data storage unit being configured to store at least one magnetic characteristic of each rip detection insert measured by said sensor in said belt map with the location data of the corresponding rip detection insert.

23. The conveyor belt monitoring system of claim 17, wherein said control unit is configured to output a signal to stop the conveyor belt when a magnetic characteristic of the rip detection insert measured by said sensor deviates beyond a second predetermined threshold from at least one of a predetermined value and a value of previously measured magnetic characteristic of the rip detection insert.

24. The conveyor belt monitoring system of claim 17 further comprising:
- a display unit configured to display a visual representation of the magnetic characteristic measured by said sensor;
- a user interface configured to enable an operator select a region of the rip detection insert containing the damage event to be filtered out from said visual representation of the magnetic characteristic measured by said sensor; and,
- said control unit being configured to filter out said region of said rip detection insert selected by the operator.

25. The conveyor belt monitoring system of claim 24, wherein:
- said sensor is configured to generate a magnetic field image of the rip detection insert; and,
- said display unit is configured to display said magnetic field image captured by said sensor.

26. The conveyor belt monitoring system of claim 24, wherein said user interface is further configured to enable the operator to disable the monitoring of a damaged rip detection insert.

27. A method for monitoring the condition of a rip detection insert embedded in a conveyor belt, the rip detection insert having a plurality of rip detection wires comprised of a magnetically permeable material; the method comprising the steps of:
- inducing a magnetic field within the rip detection wires of the rip detection insert;
- measuring at least one magnetic characteristic of the rip detection insert;
- monitoring the at least one magnetic characteristic of the rip detection insert for changes;
- determining the rip detection insert has been damaged when a change in at least one magnetic characteristic of the rip detection insert deviates beyond a predetermined threshold for the rip detection insert;
- outputting a damage event signal when damage to the rip detection insert has been determined;
- stopping the conveyor belt in response to the damage event signal so as to limit conveyor belt damage and allow for inspection of the belt; and,
- filtering out a region of the rip detection insert containing the damage to the rip detection insert so as to enable a continued monitoring of the damaged rip detection insert, wherein the region of the rip detection insert containing the damage is ignored as a result of said filtering.

* * * * *

UNITED STATES PATENT AND TRADEMARK OFFICE
CERTIFICATE OF CORRECTION

PATENT NO. : 9,815,634 B1
APPLICATION NO. : 15/135193
DATED : November 14, 2017
INVENTOR(S) : J. Wallace et al.

It is certified that error appears in the above-identified patent and that said Letters Patent is hereby corrected as shown below:

In the Specification

In Column 6:
Line 10: delete "700" and insert -- 70% -- therefor.

Signed and Sealed this
Twenty-sixth Day of December, 2017

Joseph Matal
*Performing the Functions and Duties of the*
*Under Secretary of Commerce for Intellectual Property and*
*Director of the United States Patent and Trademark Office*